Nov. 10, 1959     E. J. SCHULENBURG     2,911,744

SIGN REVOLVING MECHANISM

Filed June 6, 1957

INVENTOR.

Edward J. Schulenburg

BY

Wallenstein & Spangenberg

Attys.

2,911,744
SIGN REVOLVING MECHANISM
Edward J. Schulenburg, Danville, Ill.

Application June 6, 1957, Serial No. 664,012

5 Claims. (Cl. 40—33)

The principal object of this invention is to provide an improved revolving mechanism for a sign, which is simple in construction and fool-proof in operation, which positively rotates the sign in a direct manner and which does so with a minimum expenditure of power, which utilizes the weight of the sign for coupling the revolving mechanism to the power means, which rotates the sign within a predetermined coupling torque range, which automatically permits slipping of the revolving mechanism with respect to the power means when the coupling torque rises above a predetermined value, whereby the sign may feather in a strong wind and whereby starting and stopping of rotation of the sign may be readily accomplished without danger of overstressing or breaking the component parts of the revolving mechanism.

Briefly, the revolving mechanism of this invention includes a frame member and a post member, one of said members being rotatable and carrying the sign and the other of said members being stationary and supporting the revolving mechanism. A driving wheel is mounted on the post member for relative rotation therebetween and a thrust type friction coupling member is arranged between the driving wheel and post member, the coupling member preferably including a flanged collar rigidly secured to the post member and a friction disc interposed between the flanged collar and the driving wheel. The revolving mechanism also includes means for mounting the frame member and the post member for relative rotation therebetween and having a thrust bearing interposed between the frame member and the driving wheel. The thrust bearing preferably is a ball thrust bearing including an inner race rotatably mounted on the post member and engaging the driving wheel and an outer race rigidly secured to the frame member. The frame member carries a power means, such as an electric motor, which is connected to the driving wheel for causing relative rotation between the driving wheel and the frame member. Preferably, the friction disc is formed from a tetrafluoroethylene polymer plastic, such as Teflon, or the like, and the driving wheel and the inner race of the ball thrust bearing are rotatably mounted on the post member by sleeve bearings formed from nylon plastic or the like.

The weight of the sign acts upon the friction coupling member, that is to compress the friction disc between the driving wheel and the flanged collar, frictionally to couple together the driving wheel and the post member. When the power means is operated, the frame member and the post member are normally relatively rotated with respect to each other within a predetermined coupling torque range as determined by the friction coupling member. However, upon starting rotation of the sign or upon stopping rotation thereof, when the inertia of the sign causes the coupling torque to become greater than the predetermined value, the friction coupling member will slip to allow the sign to be brought up to speed or to be stopped without overstressing or breaking or damaging the component parts of the revolving mechanism. Likewise, when strong winds occur, which interfere with the proper turning of the sign, the friction coupling will also slip to absorb shocks to the revolving mechanism and in cases of extremely high winds will allow feathering of the sign without danger of damaging the parts of the revolving mechanism.

Further objects of this invention reside in the details of construction of the revolving mechanism and in the cooperative relationship between the component parts thereof.

Other objects and advantages of this invention will become apparent to those skilled in the art upon reference to the accompanying specifications, claims and drawing in which:

Figure 1:
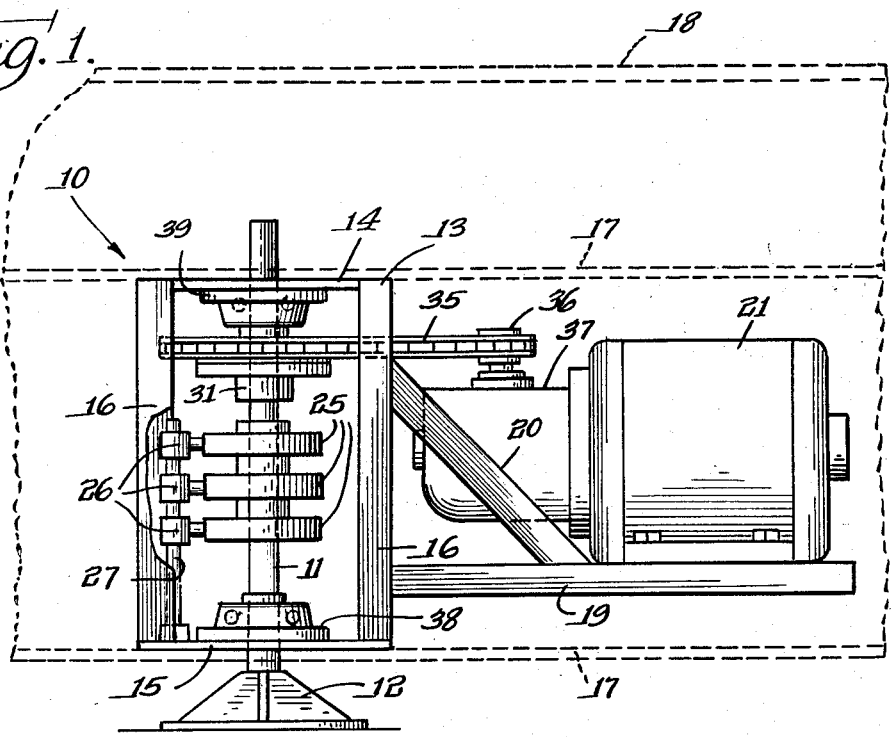
Fig. 1 is a side elevational view of the revolving mechanism of this invention.
Figure 2:
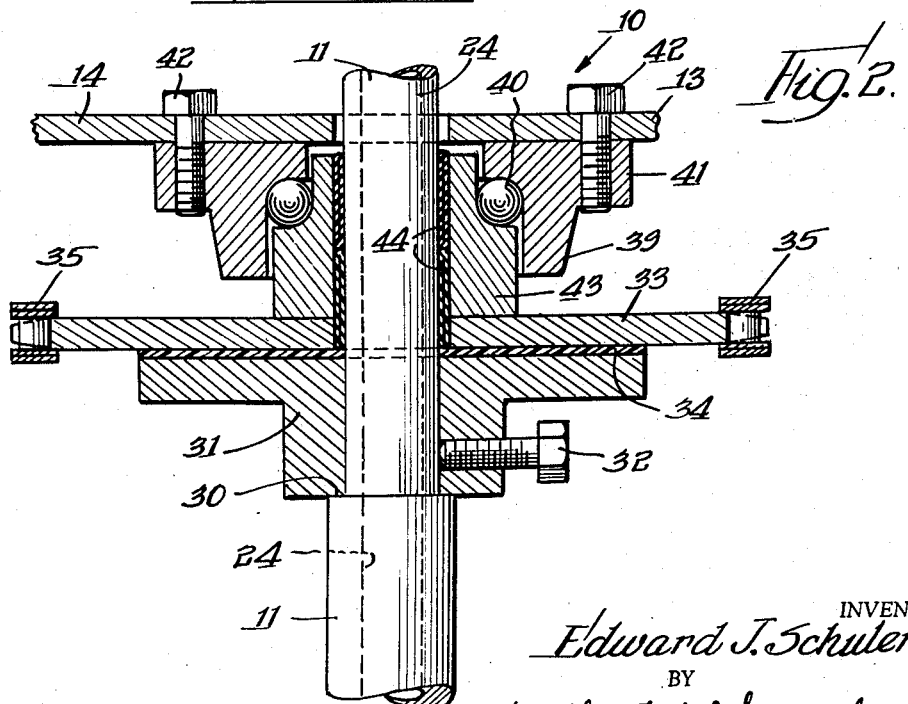
Fig. 2 is an enlarged vertical sectional view of a portion of the revolving mechanism illustrated in Fig. 1.

The revolving mechanism is generally designated at 10 in Figs. 1 and 2 and it includes a post member 11 and a frame member 13. As here illustrated the frame member 13 carries the sign 18, shown in dotted lines, and the frame member 13 and hence the sign 18 are rotatably mounted on the post member 11 which is stationary. The stationary post member 11 is secured to a suitable support 12 for mounting the revolving mechanism and the sign. The frame member 13 includes upper and lower plates 14 and 15 which are secured together by suitable angle members 16. The bracing members 17 of the sign 18 are suitably secured to the upper and lower plates 14 and 15 for mounting the sign on the frame member 13. The frame member 13 may also be provided with a sub-frame 19 braced by braces 20 for carrying a power means which may take the form of an electric motor 21.

The post member 11 is preferably hollow as indicated at 24 for accommodating electrical conductors for supplying electrical energy to the motor 21 and to lighting equipment carried by the sign 18. The electrical conductors connect with conducting rings 25 carried by the post member 11. The conducting rings 25 in turn are contacted by brushes 26 carried by a rod 27 secured to the bottom plate 15. Suitable leads not shown extend from the brushes 26 to the electric motor 21 and to the lighting equipment on the sign 18. In this way electrical energy is supplied to the lighting equipment and the electric motor 21 which rotate about the post member 11.

The post member 11 is provided with a shoulder 30 between the upper and lower plates 14 and 15 and a flanged collar 31 abuts against the shoulder 30 and is rigidly secured in place on the post member 11 by any suitable means such as a screw 32. A driving wheel 33 is rotatably mounted on the post member 11 and it overlies the flanged collar 31. A friction disc 34 is interposed between the flanged collar 31 and the driving wheel 33 and preferably this friction disc is formed from a tetrafluoroethylene polymer plastic, such as Teflon, or the like. The driving wheel 33 is preferably a sprocket wheel having teeth engaging a chain 35, which in turn engages teeth on a sprocket wheel 36 driven by a speed reducer 37 which in turn is operated by the electric motor 21. The frame member 13 is rotatably mounted on the post member 11 by means of ball thrust bearings 38 and 39 carried by the lower and upper plates 15 and 14, respectively.

The upper thrust bearing 39 includes a plurality of balls 40 interposed between an outer race 41 and an inner race 43. The outer race 41 is secured to the top plate 14 by means of screws 42 or the like. The inner race 43 is rotatably mounted on the post member 11 by means of sleeve bearings 44 preferably formed from nylon plastic, or the like. The inner race 43 also bears against the driving wheel 33. The weight of the sign 18 carried by the frame member 13 is transmitted through the ball thrust bearing 39 to the driving wheel 33 for compressing the friction disc 34 between the driving wheel 33 and the stationary flanged collar 31. The other ball thrust bearing 38 operates to guide the lower portion of the frame member 13 for rotation upon the post member 11, and it is oppositely arranged with respect to the ball thrust bearing 39.

When the power means 21 is operated, it rotates the sprocket wheel 36 through the gear reducer 37, and since the driving wheel 33 is normally held stationary by reason of the weight of the sign 18 acting therethrough to compress the friction disc 34, the chain 35 operates to cause the frame 13 and hence the sign 18 to rotate about the shaft member 11. This rotation of the frame member 13 occurs within a predetermined coupling torque range as determined by the friction coupling member comprising the flanged collar 31, the driving wheel 33, and the friction disc 34. When, however, the coupling torque exceeds this predetermined value, the driving wheel 33 slips with respect to the flanged collar 31 to allow rotation of the driving wheel 33 and a corresponding decrease in rotation of the frame member 13. Thus, upon starting rotation of the sign or upon stopping rotation thereof, where the inertia of the sign causes the coupling torque to become greater than the predetermined value, the friction coupling member will slip to allow the sign to be brought up to speed or to be stopped without overstressing or breaking or damaging the component parts of the revolving mechanism. Likewise, when strong winds occur, which interfere with the proper turning of the sign, the friction coupling member will also slip to absorb shocks to the revolving mechanism and in cases of extremely high winds, will allow feathering of the sign without danger of damaging the parts of the revolving mechanism.

If it should be desired to rotatably mount the sign from a support arranged above the rotatable sign, the supporting member 12 may be connected to the upwardly extending portion of the post member 11. When this is done, the post member 11 will depend from the upper supporting member instead of extending upwardly from the lower supporting member as illustrated in Fig. 1. In both instances the manner of operation will be the same. If it should be desired to incorporate the turning mechanism in the stationary supporting member for rotating the sign, all that is necessary is to invert the revolving mechanism and attach the sign to the post member. In such a case the frame member 13 would remain stationary and the post member 11 which carries the sign would rotate. The weight of the sign would also act upon the friction coupling member, that is to compress the friction disc between the driving wheel and the flanged collar, for the purpose of frictionally coupling together the driving wheel and the post member.

While for purposes of illustration one basic form of this invention has been disclosed, other forms thereof may become apparent to those skilled in the art upon reference to this disclosure and, therefore, this invention is to be limited only by the scope of the appended claims.

I claim as my invention:

1. A revolving mechanism for a sign, comprising, a frame member, a post member, one of said members being rotatable and carrying the sign and the other of said members being stationary and supporting the revolving mechanism, a flanged collar rigidly secured to the post member, a driving wheel mounted on the post member for relative rotation therebetween and overlying the flanged collar, a friction disc interposed between the flanged collar and the driving wheel, a ball thrust bearing mounting the frame member and post member for relative rotation therebetween and including an inner race rotatably mounted on the post member and engaging the driving wheel and an outer race rigidly secured to the frame member, and power means carried by the frame member and connected to the driving wheel for causing relative rotation between the frame member and the driving wheel, the weight of the sign acting to compress the friction disc between the flanged collar and the driving wheel frictionally to couple the same together for rotating the sign but permitting slipping therebetween upon an increase in coupling torque therebetween above a predetermined value.

2. A revolving mechanism for a sign, comprising, a frame member, a post member, one of said members being rotatable and carrying the sign and the other of said members being stationary and supporting the revolving mechanism, a flanged collar rigidly secured to the post member, a driving wheel mounted on the post member for relative rotation therebetween and overlying the flanged collar, a friction disc interposed between the flanged collar and the driving wheel, means for mounting the frame member and the post member for relative rotation therebetween and including a thrust bearing interposed between the frame member and the driving wheel, and power means carried by the frame member and connected to the driving wheel for causing relative rotation between the frame member and the driving wheel, the weight of the sign acting to compress the friction disc between the flanged collar and the driving wheel frictionally to couple the same together for rotating the sign but permitting slipping therebetween upon an increase in coupling torque therebetween above a predetermined value.

3. A revolving mechanism for a sign, comprising, a frame member, a post member, one of said members being rotatable and carrying the sign and the other of said members being stationary and supporting the revolving mechanism, a driving wheel mounted on the post member for relative rotation therebetween, a thrust type friction coupling member between the driving wheel and post member, means for mounting the frame member and the post member for relative rotation therebetween and including a thrust bearing interposed between the frame member and the driving wheel, and power means carried by the frame member and connected to the driving wheel for causing relative rotation between the frame member and the driving wheel, the weight of the sign acting upon the friction coupling member frictionally to couple together the post member and the driving wheel for rotating the sign but permitting slipping therebetween upon an increase in coupling torque therebetween above a predetermined value.

4. A revolving mechanism for a sign, comprising, a frame member, a post member, one of said members being rotatable and carrying the sign and the other of said members being stationary and supporting the revolving mechanism, a driving wheel mounted on the post member for relative rotation therebetween, a thrust type friction coupling member between the driving wheel and post member, a ball thrust bearing mounting the frame member and post member for relative rotation therebetween and including an inner race rotatably mounted on the post member and engaging the driving wheel and an outer race rigidly secured to the frame member, and power means carried by the frame member and connected to the driving wheel for causing relative rotation between the frame member and the driving wheel, the weight of the sign acting upon the friction coupling member frictionally to couple together the post member and the driving wheel for rotating the sign but permitting slipping therebetween upon an increase in coupling torque therebetween above a predetermined value.

5. A revolving mechanism for a sign, comprising, a frame member, a post member, one of said members being rotatable and carrying the sign and the other of said members being stationary and supporting the revolving mechanism, a flanged collar rigidly secured to the post member, a driving wheel overlying the flanged collar, a nylon plastic sleeve bearing mounting the driving wheel on the post member for relative rotation therebetween, a tetrafluoroethylene polymer plastic friction disc interposed between the flanged collar and the driving wheel, a ball thrust bearing mounting the frame member and post member for relative rotation therebetween and including an outer race rigidly secured to the frame member and an inner race engaging the driving wheel, a nylon plastic sleeve bearing mounting the inner race of the ball thrust bearing on the post member, and power means carried by the frame member and connected to the driving wheel for causing relative rotation between the frame member and the driving wheel, the weight of the sign acting to compress the friction disc between the flanged collar and the driving wheel frictionally to couple the same together for rotating the sign but permitting slipping therebetween upon an increase in coupling torque therebetween above a predetermined value.

References Cited in the file of this patent

UNITED STATES PATENTS

| | | |
|---|---|---|
| 814,383 | MacArthur | Mar. 6, 1906 |
| 2,209,858 | Steiert | July 30, 1940 |
| 2,556,472 | Gray | June 12, 1951 |
| 2,741,861 | Roe | Apr. 17, 1956 |